Feb. 4, 1969  A. B. NEWTON  3,425,485
AIR CONDITIONING UNIT AND PUMP FOR SINGLE PIPE SYSTEM
Filed June 28, 1967
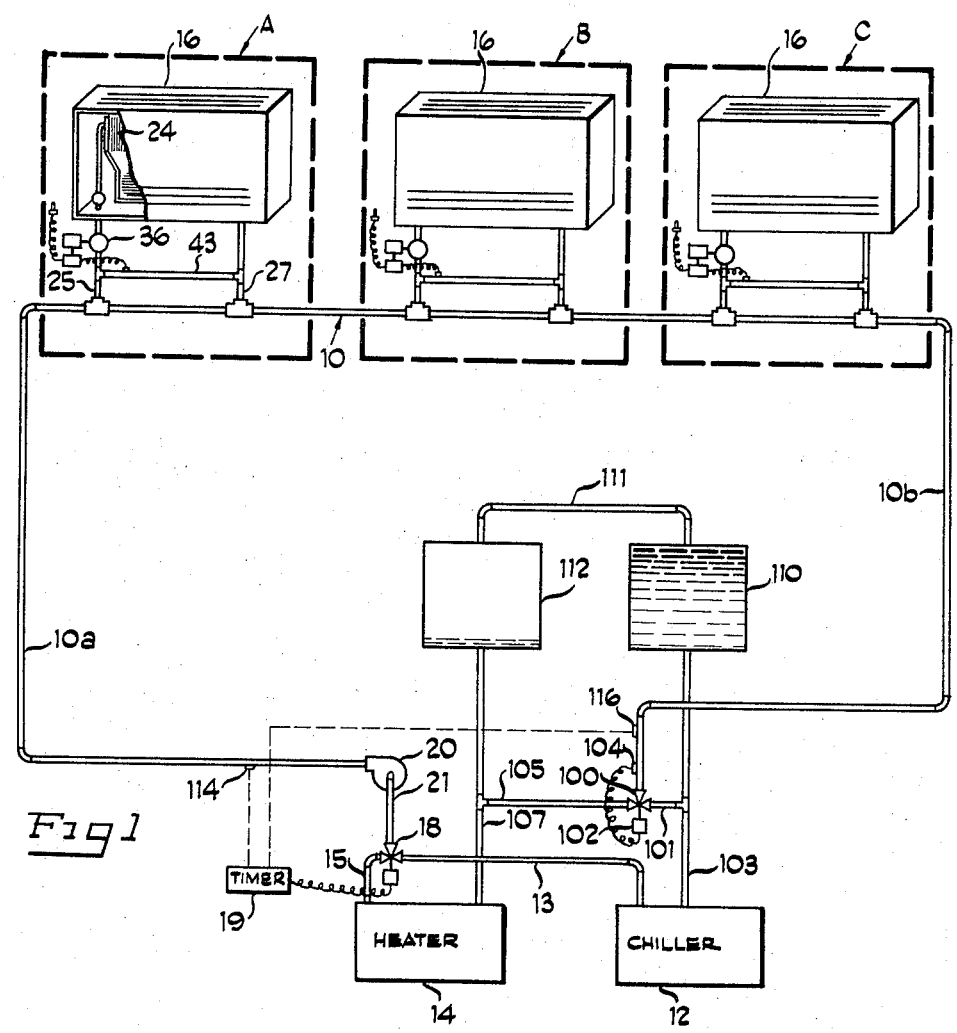
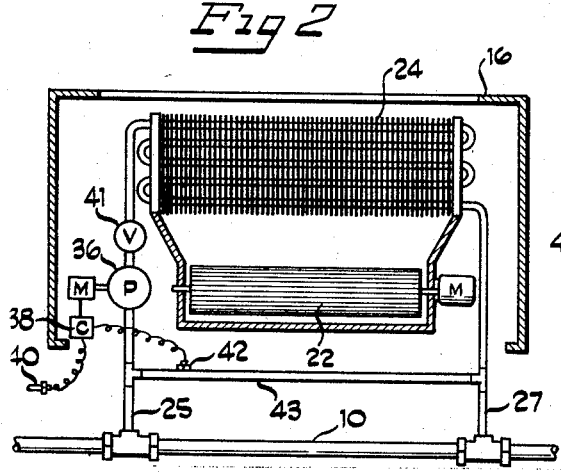
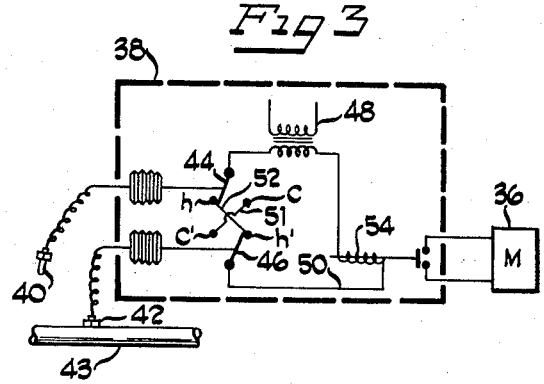
INVENTOR
ALWIN B. NEWTON
BY *Thomas B Hunter*
ATTORNEY United States Patent Office
3,425,485
Patented Feb. 4, 1969

3,425,485
AIR CONDITIONING UNIT AND PUMP FOR SINGLE PIPE SYSTEM
Alwin B. Newton, Spring Garden Township, York County, Pa., assignor to Borg-Warner Corporation, Chicago, Ill., a corporation of Illinois
Filed June 28, 1967, Ser. No. 649,512
U.S. Cl. 165—22   3 Claims
Int. Cl. F24h 7/04, 9/20; F25b 29/00

ABSTRACT OF THE DISCLOSURE

A control system for a single-pipe air conditioning system in which heated and chilled water is alternately supplied to a plurality of room or zone air handling units. The water supplied to the units is circulated through a heat exchanger in the air handling units by means of a pump which is intermittently operated. The pump is operated (1) if the room requires cooling and chilled water is available, and (2) when the room requires heating and heated water is available. Otherwise, the pump is inoperative and there is no flow through the heat exchanger. In order to reduce the length of the temperature sensing element which senses water temperature, a bypass line is provided in parallel with each of the heat exchangers, said line always passing a small amount of water at the same temeprature as the water flowing through the main. A lightly loaded valve placed downstream from the pump insures that water does not flow through the heat exchanger unless the pump is operating.

Summary and background of the invention

This invention relates generally to single-pipe air conditioning systems and more particularly to a control for sensing the temperature of water available for heating and cooling.

In a single pipe system, a single, closed circuit conduit supplies a heat exchange medium (usually water) to a plurality of air handling units located in different rooms to condition the air circulated through each such zone. If hot and cold water is made available, the temperature within each room may be adjusted according to the individual requirements and the loading in the zone. One practical system for this purpose is described in copending application Ser. No. 522,588 filed on Jan. 14, 1966, now Patent No. 3,384,155. This system provides means for alternately supplying heated and chilled water through a main conduit (hereinafter referred to as the main) and to which the individual air handling units are connected. Means are provided for selectively routing the water being circulated through a heater and a chiller; and an appropriate timing device adjusts the length of the heating and cooling cycles according to the load. Preferably, a reservoir is also provided to store heated and chilled water during the "off" cycle so that when a transition is made, the amount of heat supplied to (or removed from) the water is minimized.

In a previous design, the control means for sensing the temperature of water flowing through the main included a capillary bulb directly connected to the main and an air temperature sensing element which cooperated with the water temperature sensor to control a valve or a pump which selectively permitted flow through the heat exchanger in the air handling unit. One disadvantage of this system is that the water temperature sensing capillary, in many cases, had to be quite long because the air handling unit may be located at a considerable distance from the main. The long capillary tube usually introduces some error in the control due to the ambient air surrounding the tube.

The present invention is directed to an improved system in which a bypass line is provided close to the heat exchangers and through which a small amount of water is circulated concurrently with the water through the main. Since both are at the same temperature, the water sensing element may be placed in heat exchange relation with the bypass line to achieve the same result.

It is therefore a principal object of the invention to provide an improved control system for a single-pipe air conditioning system.

Another object of the invention is to provide a system in which the water temperature sensing components may be placed quite close to the air handling unit to effect more accurate control of the system.

Additional objects and advantages will be apparent from the following detailed description taken in conjunction with the drawings.

Brief description of the drawings

FIGURE 1 is a schematic illustration of a preferred embodiment of the invention;

FIGURE 2 is a cross-sectional view, partly schematic, of an air conditioning unit embodying the present invention; and FIGURE 3 shows a control circuit adapted for use in the present invention.

Referring now to FIGURE 1, the main water supply and return conduit 10 constitutes the major portion of a closed circuit conduit system including a supply riser 10a and a return riser 10b. Main 10 interconnects a conventional liquid chiller 12, a heater or boiler 14, and a plurality of room air conditioning units or air handling units 16, which are respectively located in rooms or zones A, B, and C to be conditioned. The outlet line 13 from the chiller 12 and the outlet line 15 from the water heater 14 are both connected to a three-way valve 18 which selectively supplies cold or hot water to the inlet side of a liquid pump 20 by way of line 21. Valve 18 is controlled by a timer 19 in a manner which will be described in more detail below. It should be understood that the room units and zones illustrated in FIGURE 1 are merely representative of a large number of such units and zones in a typical multi-room installation.

The room air conditioning units 16 each include a fan 22 or other suitable air circulating means and a heat exchanger 24 which is supplied with water from main 10 through individual inlet lines 25. The water leaving the heat exchangers 24 is returned to conduit 10 through individual outlet lines 27.

Each of the inlet lines 25 includes a pump 36 actuated by a control 38 in response to: (1) the temperature of the air in the zones to be conditioned as sensed by temperature responsive bulbs 40 (or other suitable means); and (2) the temperature of water available to the room unit heat exchangers as sensed by temperature responsive bulbs 42 (or other suitable means) in temperature sensing relation with a bypass line 43 connected across inlet line 25 and outlet line 27 in parallel with heat exchanger 24. When any of the air temperature sensing bulbs 40 senses a temperature above the desired temperature level, thereby calling for cooling, pump 36 will be energized only if cold water is circulating through main 10 and bypass 43; and, if bulbs 40 sense a temperature below the desired temperature level, thereby calling for heating, pump 36 will be energized only if hot water is circulating through main 10 and bypass 43.

In order not to allow too much flow of water through the bypass line 43, it is desirable to provide suitable restriction or metering orifice in the line to control the flow. Also, a lightly-loaded, one-way valve 41 is placed downstream from the pump 36 so that when the pump is not operating, the valve will prevent flow through the heat exchanger; and any water that is withdrawn from the main will flow through bypass line 43.

The pump control 38 for room units 16 may be constructed in the manner shown in FIGURE 3. Two SPDT switches 44 and 46 are actuated by bulbs 40 and 42 respectively. Switch 44 is movable between contact $c$ (corresponding to a demand for cooling and closed at approximately 74° F.) and contact $h$ (corresponding to a demand for heating and closed at approximately 73° F.). Switch 46 is movable between a contact $c'$ (closed below 65° F. and indicating that water in 10 is available for cooling) and contact $h'$ (closed above 80° F. and indicating that hot water is available for heating). A circuit including switches 44, 46, a power supply 48, conductors 50, 51, 52, and pump motor start relay 54 is provided such that the pump 36 is operated only when the $c$ and $c'$ contacts are closed; or alternatively, when the $h$ and $h'$ contacts are closed. In the solid-line position illustrated, hot water is flowing in conduit 10 so that switch arm of switch 46 completes a circuit through contact $h'$. The temperature within the room is such that it is calling for heating from the room air conditioning units so that the switch arm on switch 44 is closing the $h$ contact. Since contacts $h$ and $h'$ are connected by conductor 51 and contacts $c$ and $c'$ are connected by conductor 52, the circuit between the two switches is closed. Therefore, the pump start relay 54 is energized to operate the pump.

Although the previous description has referred to a fan coil unit as being utilized in the system, it is also possible to use induction units, the construction and operation of which are well understood in the art. Primary air from a suitable source is directed into a plenum chamber and directed through a nozzle or equivalent means into an induction chamber. Room air is induced to pass over a heat exchange coil which is supplied with heated or chilled water. In adapting the present system to use induction units, the heat exchange coils 24 in the fan coil unit correspond to the heat exchangers in the induction unit over which room or secondary air is induced. Otherwise, the control is identical with the system as heretofore described.

Referring back to FIGURE 1, the flow control for water supplied to the room units will now be described. The water returning from all the room units interconnected with conduit 10 is directed through return riser 10b to a three-way valve 100 which is adapted to selectively feed either a line 101 connected to the water chiller inlet line 103 or line 105 which is connected to the heater inlet line 107. A valve actuating control 102 is responsive to the temperature of returning fluid as sensed upstream from the valve by temperature responsive bulb 104 and selectively directs the returning water to the heater 14 or chiller 12 depending on its temperature. If the returning water is below approximately 70°, the valve is open to line 101; and if it is above 70°, the valve is moved to a position interconnecting return riser 10b and line 105.

In order to economize on the operation when the water supply is changed from hot water to cold water or vice versa, two reservoir tanks 110 and 112 are provided. Cold water reservoir 110 is interconnected to the chiller inlet line and the hot water reservoir 112 is connected to the heater inlet line 107. A pressure equalizing line 111 interconnects the upper portion of the two reservoirs.

The cycling of the system to alternately supply hot and cold water to the room units is under the operation of a timing mechanism 19 which actuates the three-way supply valve 18 on the inlet side of the pump. Valve 18 is controlled on a schedule such that if the heating loads are above some predetermined level (approximately 60 percent of the maximum load for the entire building), the three-way valve is positioned so that it will circulate heated fluid from heater 14 to all of the room units. If the cooling loads are above some predetermined level (approximately 75 percent of the maximum load for the entire building), valve 18 will be positioned to interconnect lines 13 and 21 so as to continuously circulate chilled fluid from chiller 12. At intermediate load conditions, valve 18 is alternately cycled by timer 19 to first circulate chilled water and then hot water for predetermined intervals. Preferably, the ratio of the time hot water is circulated to the time cold water is circulated is dependent on the relative heating to cooling needs. This may be determined by sensing the relative temperature drop (or rise) through the entire system as measured by sensing the temperature of the water supplied to the units at 114 and the water returned from the units at 116. This may be done automatically by a suitable cycling programmer, or manually by the operator or building engineer.

While this invention has been described in connection with a certain specific embodiment thereof, it is to be understood that this is by way of illustration and not by way of limitation; and the scope of the appended claims should be construed as broadly as the prior art will permit.

What is claimed is:

1. A multi-room air conditioning system comprising:
    (A) a plurality of room air conditioning units located in a plurality of zones subjected to varying thermal loads, each said conditioning unit including
        (1) a liquid to air heat exchanger and
        (2) air circulating means for circulating room air over said heat exchanger;
    (B) a heater adapted to heat a liquid heat exchange medium;
    (C) a chiller connected in parallel with said heater adapted to cool a liquid heat exchange medium;
    (D) a closed circuit conduit system interconnecting said room units, said heater and said chiller, said system including
        (1) a main conduit,
        (2) individual inlet conduits connected between said main conduit and the inlet side of each of said heat exchangers in said room unit, and
        (3) individual return conduits connected between said main conduit and the outlet side of said heat exchangers;
    (E) temperature control means associated with each of said room units, said control means being operative to effect heat transfer between the circulating heat exchange medium and the air in said zones only upon a demand for cooling when chilled medium is available and upon a demand for heating when heating medium is available;
    (F) means for alternately circulating heated and chilled medium for predetermined intervals to said room air conditioning units from said heater and said chiller respectively when certain of said zones require heating and others require cooling; and
    (G) bypass lines connected between said inlet conduits and said outlet conduits in parallel with said heat epchanger to receive said chilled and heated medium, said temperature control means including a sensing element in heat transfer relation with said bypass line.

2. A system as defined in claim 1 including a pump associated with each of said inlet lines for circulating said liquid heat exchange medium through said heat exchanger, said temperature control means including a first temperature sensing element for sensing the temperature of liquid medium passing through said bypass lines and a second temperature sensing element sensing the demand for heating and cooling, said control means adapted to energize said pump only upon a demand for cooling when chilled medium is available and upon a demand for heating when heated medium is available.

3. An air handling unit for a single-pipe air conditioning system comprising:
- (A) a liquid-to-air heat exchanger;
- (B) air circulating means for circulating room air over said heat exchanger;
- (C) an inlet conduit adapted to supply a liquid heat exchange medium to said heat exchanger;
- (D) a return conduit adapted to discharge liquid heat exchange medium from said heat exchanger;
- (E) a bypass conduit connected between said inlet and return conduits in parallel with said heat exchanger;
- (F) a pump in said inlet conduit between said bypass conduit and said heat exchanger; and
- (G) temperature control means including a first temperature sensing element for sensing the temperature of liquid medium passing through said bypass conduit and a second temperature sensing element sensing the demand for heating and cooling, said control means adapted to energize said pump only upon a demand for cooling when chilled medium is available and upon a demand for heating when medium is available.

References Cited

UNITED STATES PATENTS

| | | | |
|---|---|---|---|
| 3,127,929 | 4/1964 | Ringquist | 165—22 |
| 3,191,667 | 6/1965 | Lorenz | 165—22 |
| 3,303,873 | 2/1967 | Ringquist | 162—22 |

WILLIAM J. WYE, *Primary Examiner.*

U.S. Cl. X.R.

165—14, 27, 50